(12) United States Patent
Jemison et al.

(10) Patent No.: US 8,718,687 B2
(45) Date of Patent: *May 6, 2014

(54) SYSTEM AND METHOD FOR MEDIATING SERVICE INVOCATION FROM A COMMUNICATION DEVICE

(75) Inventors: Timothy Jemison, Palo Alto, CA (US); Gerald T. Christensen, Louisville, CO (US)

(73) Assignee: Zoove Corp., Palo Alto, CA (US)

( * ) Notice: Subject to any disclaimer, the term of this patent is extended or adjusted under 35 U.S.C. 154(b) by 1162 days.

This patent is subject to a terminal disclaimer.

(21) Appl. No.: 11/985,576

(22) Filed: Nov. 15, 2007

(65) Prior Publication Data

US 2008/0108333 A1    May 8, 2008

Related U.S. Application Data

(63) Continuation-in-part of application No. 11/891,853, filed on Aug. 13, 2007, which is a continuation-in-part of application No. 10/400,196, filed on Mar. 26, 2003, now Pat. No. 7,257,391.

(60) Provisional application No. 60/367,606, filed on Mar. 26, 2002.

(51) Int. Cl.
*H04W 4/00*    (2009.01)

(52) U.S. Cl.
USPC ..... 455/466; 455/414.1; 455/418; 455/426.1; 455/426.2; 455/432.3; 370/338; 379/201.02; 379/207.02; 379/221.14; 379/242; 379/350; 705/14.4; 705/77

(58) Field of Classification Search
USPC .............. 455/410, 405, 414.1, 433, 466, 401, 455/418, 426.1, 426.2, 432.3; 370/328–338; 379/93.01, 114.13, 379/142.04, 201.02, 207.02, 221.14, 242, 379/350; 705/14.4, 77

See application file for complete search history.

(56) References Cited

U.S. PATENT DOCUMENTS 5,566,235 A    10/1996    Hetz
5,692,039 A    11/1997    Brankley et al.

(Continued)

FOREIGN PATENT DOCUMENTS

WO    WO 01/11507    2/2001
WO    WO 01/20478    3/2001

(Continued)

OTHER PUBLICATIONS

U.S. Appl. No. 60/240,642, filed Oct. 16, 2000, Annan.

*Primary Examiner* — Quan M Hua
(74) *Attorney, Agent, or Firm* — Bingham McCutchen LLP

(57) ABSTRACT

A system and method for enabling a number of service providers to respond to communication device user service invocations through a service invocation distribution center. A telecommunications switch is provisioned with a trigger that operates based on a service prefix code in a service invocation message. Calling events that include various service prefix codes that match trigger firing criteria cause the trigger to execute call control logic within the telecommunications switch to forward information concerning the service invocation to the distribution center. The distribution center matches a service provider with a prefix code in conjunction with the forwarded information and forwards the service invocation to the appropriate service provider. The service invocation message may include a service code that indicates the specific service requested. The triggers are provisioned in the telecommunications switch once, thereby reducing complexity and administrative burdens in relation to providing services through a telecommunications system.

21 Claims, 7 Drawing Sheets

(56) References Cited

U.S. PATENT DOCUMENTS

| | | | |
|---|---|---|---|
| 5,752,186 A * | 5/1998 | Malackowski et al. | 455/414.1 |
| 5,835,583 A | 11/1998 | Hetz et al. | |
| 5,838,768 A | 11/1998 | Sumar et al. | |
| 5,852,775 A * | 12/1998 | Hidary | 455/412.1 |
| 5,862,334 A | 1/1999 | Schwartz et al. | |
| 5,898,917 A * | 4/1999 | Batni et al. | 455/564 |
| 6,029,065 A * | 2/2000 | Shah | 455/414.4 |
| 6,122,510 A | 9/2000 | Granberg | |
| 6,148,069 A | 11/2000 | Ekstrom et al. | |
| 6,167,435 A | 12/2000 | Druckenmiller et al. | |
| 6,185,289 B1 | 2/2001 | Hetz et al. | |
| 6,304,753 B1 * | 10/2001 | Hartmaier | 455/413 |
| 6,317,594 B1 | 11/2001 | Gossman et al. | |
| 6,397,057 B1 | 5/2002 | Malackowski et al. | |
| 6,442,549 B1 * | 8/2002 | Schneider | 1/1 |
| 6,560,327 B1 | 5/2003 | McConnell | |
| 6,728,361 B1 | 4/2004 | Ouyang | |
| 6,940,847 B1 | 9/2005 | Glitho et al. | |
| 7,139,384 B1 | 11/2006 | Ekstrom et al. | |
| 2001/0025345 A1 * | 9/2001 | Jung et al. | 713/200 |
| 2001/0039191 A1 | 11/2001 | Maierhofer | |
| 2002/0013727 A1 | 1/2002 | Lee | |
| 2002/0044639 A1 * | 4/2002 | Shioda et al. | 379/207.02 |
| 2002/0059148 A1 * | 5/2002 | Rosenhaft et al. | 705/77 |
| 2002/0101975 A1 | 8/2002 | Tiburtius et al. | |
| 2002/0129354 A1 * | 9/2002 | Bryan et al. | 717/176 |
| 2002/0164977 A1 | 11/2002 | Link, II et al. | |
| 2003/0028430 A1 | 2/2003 | Zimmerman | |
| 2003/0028441 A1 | 2/2003 | Barsness et al. | |
| 2003/0211845 A1 * | 11/2003 | Lohtia et al. | 455/414.3 |

FOREIGN PATENT DOCUMENTS

| | | |
|---|---|---|
| WO | WO 01/33464 | 5/2001 |
| WO | WO 01/71949 | 9/2001 |
| WO | WO 01/80583 | 10/2001 |
| WO | WO 02/33990 | 4/2002 |
| WO | WO 02/39765 | 5/2002 |
| WO | WO 02/078316 | 10/2002 |
| WO | WO 02/080592 | 10/2002 |
| WO | WO 02/091252 | 11/2002 |

* cited by examiner

SYSTEM AND METHOD FOR MEDIATING SERVICE INVOCATION FROM A COMMUNICATION DEVICE

CROSS REFERENCE TO RELATED APPLICATIONS

The present application is a continuation-in-part application of U.S. application Ser. No. 11/891,853, filed Aug. 13, 2007, entitled SYSTEM AND METHOD FOR SERVICE INVOCATION AND RESPONSE WITH A COMMUNICATION DEVICE, which is a continuation-in-part application of U.S. application Ser. No. 10/400,196, filed Mar. 26, 2003, entitled WIRELESS DATA SYSTEM, which claims priority benefit of U.S. Provisional Application No. 60/367,606, entitled WIRELESS DATA SYSTEM, filed Mar. 26, 2002, the whole of each of which disclosures is hereby incorporated herein by reference.

STATEMENT REGARDING FEDERALLY SPONSORED RESEARCH OR DEVELOPMENT

N/A

BACKGROUND

The present disclosure relates generally to service invocation in a communication system, and relates more specifically to a system and method to permit a user of a communication device to invoke a service through a service mediation center that distributes service invocations among a plurality of service providers.

Invocation and fulfillment of services from a communication device, especially a telephone, in a communication system has been implemented in accordance with various techniques to help simplify service invocation and expand service offerings. Such systems could be employed, for example, to direct a call to a pizzeria nearest the caller's home address when the call is placed to a central number to order a pizza.

Prior service invocation systems have been implemented in a communication system with a telecommunications switch configured to recognize a service invocation and conduct operations leading to service fulfillment. A telecommunications switch is a component in a networked communication system, responsible for providing connections through the communication system on an automatic basis. A cellular communication system employs telecommunications switches called mobile switching centers (MSC) that operate to provide connectivity for cellular radio-based communications. The term "telecommunications switch" is meant to encompass MSCs, wireline or land-based communications switches, IP PBX (internet protocol private branch exchange), television set-top boxes, routers, session initiation protocol (SIP) devices, and any other type of telecommunications equipment that can offer automatic switching.

Transmitted dialed digit strings may be used to invoke services from a communication device. Typically, the dialed digit strings are shorter than a directory telephone number, and are sometimes referred to as "short codes." In the following discussion, the term short code refers to an entire dialed digit string representing a code other than a directory dialed number that is handled by the telecommunications switch in a manner other than that for directory dialed number call processing. The short code is to be differentiated from a short message service (SMS) code, where a user sends a code to a particular address using SMS messaging. The user provides the short code with an originating communication device, such as a telephone, and then transmits the short code to a telecommunications switch to prompt the service invocation.

One available system uses transmitted dialed digit strings referred to as abbreviated dial codes (ADCs) to permit service invocation. The ADCs are typically associated with a specific carrier, and are implemented by provisioning a telecommunications switch with static entries in a translation table or with static translation rules. The translation table or rules have entries for ADCs and corresponding directory telephone numbers into which the ADCs are translated. The ADC is recognized by the telecommunications switch as a call that receives special treatment compared to a directory telephone number call.

An example of an ADC implementation involves a cellular phone communicating with a serving mobile switch center (MSC). The cellular phone user enters an ADC and presses "send" to transmit the ADC to the MSC. The MSC translates the ADC to a dialable or "routable" number for purposes of call setup. The resulting routable number is used to connect the caller with an interactive voice response (IVR) that provides voice prompts to permit the caller to select desired content, which is pushed to the wireless phone upon selection. The translations typically convert the ADC to a toll-free number for the purposes of routing a call from a communication device through the communication network. In this configuration, a translation entry or a translation rule is provisioned within the MSC for each ADC for each service desired, and for each carrier that wishes to provide the service indicated by the associated ADC.

One short code system involves GSM (Global System for Mobile Communications) unstructured supplementary service data (USSD), which provides a standard-based approach to allow users to use preprogrammed, i.e., USSD capable mobile devices, to make special network service requests, such as account balance inquiries, initiating/canceling call forwarding, and other service requests, for example. The telecommunication switches and USSD capable devices, such as mobile devices capable of making special network service requests, are provisioned or preprogrammed to recognize a specific dialing sequence containing a special prefix and special suffix. The prefix, such as "**", for example, and suffix, such as "#" indicate that the code encompassed by the prefix and suffix is a USSD code, which is recognized by both the communication device and telecommunication switch to fulfill the special network service request. The preprogramming and provisioning of both the communication device and the telecommunications switch is based on GSM standards specified by standard committees associated with implementing the GSM standards.

In some cellular radio telecommunication systems, the MSC is provisioned with triggers to recognize short codes. U.S. Pat. No. 5,898,917 describes one prior system, in which trigger criteria is defined in the MSC using the "#" character. Calls received by the MSC that include the "#" character are followed by a digit sequence that identifies the service to be invoked. Receipt of the "#" character results in the MSC suspending call processing and generating a service query message to a service control point (SCP). The service query message includes the digit sequence identifying the invoked service. The SCP interprets the query message including the digit string to determine how the call is to be handled. The SCP provides a response to the MSC with instructions or information that indicates how the call is to be handled. If the SCP recognizes the digit sequence, the response to the MSC typically indicates that the call should be forwarded to an IVR system where the caller receives voice content, such as voice instructions or information.

As described above, a trigger is a configuration of call-processing logic associated with a given point in a call. Triggers are generally implemented in software to carry out instructions to initiate a communication network process based on analysis of status conditions at a detection point (DP) in the call. A DP is a part of a sequence in a basic call state model (BCSM) at which status conditions related to the call can be determined.

In the above described arrangement, the telecommunications switch in the communication system is configured and enabled to recognize short codes. The telecommunications switch may be configured for a variety of triggers, including subscriber-based, group-based and office-based. Subscriber-based triggers, which a carrier implements in a separate database, instruct the telecommunication switch how to handle a call from a specific subscriber containing a digit string containing a short code. Group-based triggers provide call handling that is consistent for a particularly defined group. Office-based triggers are provided for general use to handle calls for a generic user. The features provided by office-based triggers are generally available to all users that access the telecommunications switch. The user need not have a subscription or registration to obtain the features offered by the provisioning in the telecommunications switch of the office-based trigger. Implementing an office-based trigger is accomplished by reconfiguring the telecommunications switch to recognize the desired short codes.

Services available through short code dialing can relate to telecommunication features, such as 800 services, credit card verification, geographic call routing, flexible call routing, flexible carrier selection and other features that may be carrier based. In addition, a variety of service fulfillment activities are available that are not necessarily related to telecommunication service. For example, service fulfillment may be in the form of storage of a preference, a return voice call, an SMS (short message service) text message, email messages, facsimile machine delivery, a WAP (wireless application protocol) push, or traditional postal system mail. Types of services that may be available can include, for example, providing information about advertised products or services, participation in voting or polling activities, obtaining reprints of articles or other publications, browsing and purchasing magazine subscriptions, or downloading of ring tones.

The provisioning of translation entries, translation rules or triggers in the MSC can be complex and relatively difficult, and thus represents an administrative burden for administrators of the MSC and the communication system. The volume of services that may be made available can be vast, and the available services may change on a rapid basis. For example, an offered service may be tied to a short-term promotional activity of a sponsor for a specific time interval of a given day. Implementing such a service would mean provisioning the MSC with a specific translation entry, translation rule or trigger to recognize the short code, and subsequently removing the translation entry, translation rule or trigger for recognition of the short code shortly thereafter. Each time an administrator interacts with the MSC to provide or remove translation or trigger provisions, the effort can prove costly, complex and time consuming. Translations or triggers may be provisioned in an MSC and armed or disarmed according to how a service provider or carrier wishes to offer a service connected with the translation or trigger. However, changing how a translation or trigger is armed or disarmed represents a similar challenge to that of modifying the MSC in that the carrier subscriber database would be modified to reflect the change in translation or trigger treatment.

In addition, provisioning an MSC to recognize a short code represents a nontrivial task because of the configuration of the MSC and the BCSM. Provisioning a given office-based trigger, for example, intended to recognize a short code, calls for selective arming according to a number of different criteria. The trigger may be inserted in a number of different DPs within the BCSM. In addition, the trigger may have a number of different criteria for being actuated.

For example, subscriber-based intelligent network triggering may be armed at a home location register (HLR), allowing establishment of trigger criteria at a serving visitor location register (VLR) and MSC. However, trigger conflicts may arise at the MSC when various applications, such as, for example, prepaid communication service, virtual private network (VPN) and other trigger-based applications vie for trigger firing at the same DP within the intelligent network BCSM.

Previous approaches to solving these conflicts, sometimes referred to as "trigger collisions," involve the use of a service interaction manager (SIM), which is a functional element that, in the case of an office-based trigger, mediates messaging between the telecommunications switch or MSC and SCP to permit multiple applications to use the same DP. Trigger-based applications typically seek to be actuated or fired at DP number two (DP-2) for most implementations.

The SIM is configured to receive an initial query from an MSC to manage the services invoked at a triggered DP acting as the source of the query. The SIM therefore manages interactions between services that are provisioned at the same trigger point. The management provided by the SIM permits service invocation priority to be established, as well as providing interaction between network components to appropriately handle all service invocations while avoiding service invocation interference. The SIM function may reside in the HLR or the SCP.

In the case of short code services implemented in a telecommunications switch or MSC at a given trigger detection point in the BCSM, there is a limitation on the trigger responses. The trigger firing criteria for particular digits that are part of the short code, such as "#", causes a query or message to be launched to the same SS7 point code destination address, regardless of what the particular digits are. SS7 signaling and addressing is described in greater detail below. For example, appropriate triggers provisioned in the telecommunications switch or MSC to recognize and trigger on the short codes #238, **1234 and ##9837 all cause a query to be initiated and routed to one SCP to seek differentiation of the services invoked by the different short codes. Each of the short codes may be managed and provided by a different service provider. The SIM is unable to easily differentiate the different service providers for short code services, since it is functionally directed to differentiating applications that share a DP trigger in the BCSM. That is, the SIM cannot easily differentiate short codes that have the same trigger criteria at the same DP trigger. In addition, the SCP is unable to distinguish the services associated with different short codes because it operates with SS7 signaling, which is limited in the types of control that is possible within the available messaging operations. The SCP also does not have the functionality to fulfill service invocation requests initiated with short codes. Moreover, because it uses SS7 signaling, the SCP is unable to discriminate messages that are intended for different service requests or different service providers. The SCP can only pass on the messages to a previously provisioned forwarding address.

Accordingly, short code service invocation and service fulfillment is practically realized at present by provisioning the telecommunications switch or MSC with logic and identifiers in each instance that a short code response is desired.

SUMMARY

In accordance with the disclosed system and method, a mobile switching center (MSC) is provisioned with a trigger to recognize a service prefix code. The trigger may be subscriber, group or office based. The trigger may be armed in accordance with a trigger profile related to subscriber-based service invocation. Upon being triggered, the MSC generates a message that is delivered to a service processing center, or short code resolution server (SCRS), which can mediate and distribute service invocations among different service providers or carriers, for example. The SCRS handles resolution of any potential conflicting service invocations.

The disclosed system and method provides a wide range of services for a user of a communication device in a communication system based on a service invocation request directed through the communication system to a mediating SCRS. The SCRS includes mechanisms for distributing service invocations among a number of service providers to permit service fulfillment based on the specific service invocation request. The SCRS acts as a single point of contact for service invocations based on one or more service invocation triggers provisioned in the telecommunications switch or MSC. The telecommunications switch or MSC can be provisioned once with a trigger that recognizes various service prefix codes.

The use of the SCRS as a service invocation distribution or mediation point represents a significant increase in flexibility for providing services to users of communication devices in the communication system, while removing significant administrative burdens on the switch or MSC administrators of the communication system. The SCRS can be accessed by a variety of carriers and service providers. The SCRS can translate service invocation codes to queries, messages or signaling and prompt service invocation by service providers accordingly. Service invocation can be initiated through the communication system, and realized through a number of different transmission systems or protocols with the appropriate configuration of the SCRS.

With the configuration of the service invocation and fulfillment system in accordance with the disclosed system and method, a number of different service providers can be reached by a user sending digit sequences including a service prefix code from a communication device. The service prefix code can be implemented in a limited number of symbols, such as "**", for example, which serves to identify the SCRS that can distribute service invocations or act as a service mediator on the basis of the service prefix code provided. In accordance with this configuration, a telecommunications switch or MSC can be provisioned with a single trigger and trigger criteria to permit message routing to a single SCP for all service prefix codes.

BRIEF DESCRIPTION OF THE SEVERAL VIEWS OF THE DRAWINGS

The disclosed system and method is described in greater detail below with reference to the detailed description in conjunction with the accompanying drawings, of which:

FIG. 5 is a call flow diagram illustrating operation of another exemplary embodiment of the disclosed system; and.

DETAILED DESCRIPTION OF THE INVENTION

The entirety of all disclosures of utility patent application Ser. No. 11/891,853, filed Aug. 13, 2007, entitled SYSTEM AND METHOD FOR SERVICE INVOCATION AND RESPONSE WITH A COMMUNICATION DEVICE, utility patent application Ser. No. 10/400,196, filed Mar. 26, 2003, entitled WIRELESS DATA SYSTEM, and provisional patent application Ser. No. 60/367,606, filed Mar. 26, 2002, entitled WIRELESS DATA SYSTEM, are hereby incorporated herein by reference.

Figure 1:
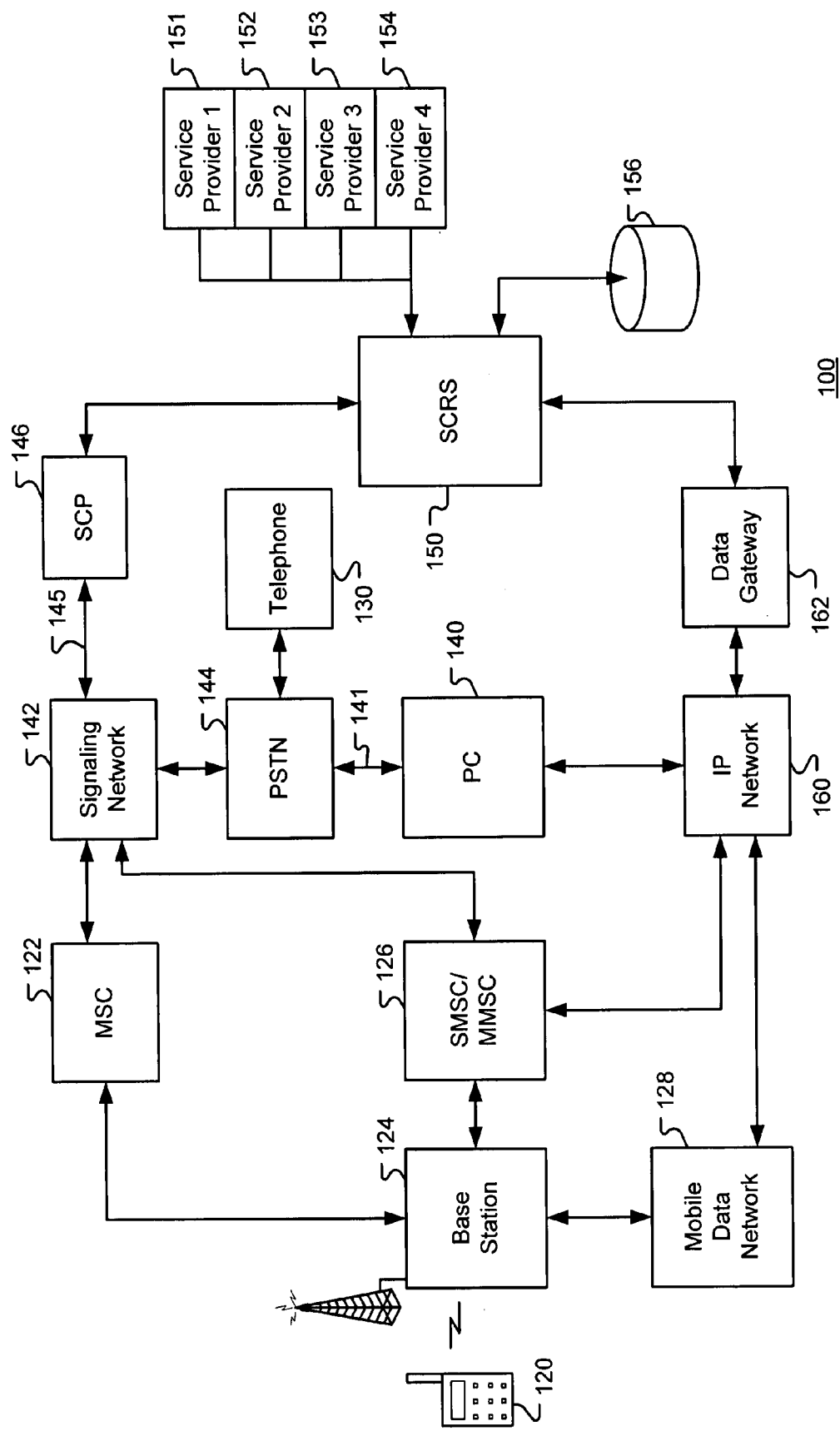
FIG. 1 is a block diagram of a communication network illustrating an exemplary embodiment of the disclosed system.

Referring now to FIG. 1, a communication system 100 provides an architecture for realizing the disclosed system and method whereby a user of a communication device 120, telephone 130 or PC 140 can invoke services from service providers 151-154. Communication device 120 can be a wireless telephone device, for example. The user provides a special code that is delivered to a SCRS, or short code resolution server (SCRS) 150, where a service provider or name space is determined based on the content of the special code. SCRS 150 distributes service invocation among service providers 151-154 based on the special code provided by the user. SCRS 150 acts as a point of mediation and proxy between a service control point (SCP) 146 and various service providers 151-154 to identify which service provider should receive data associate with a given dialing event. SCRS 150 therefore mediates and acts as a proxy for messaging specific to dialable short code dialing events rather than mediating messaging between applications. SCRS 150 determines the indicated service provider by analyzing the combination of the service prefix code (*, #, **, ##, *#, and #*) and service code, typically a numerical digit sequence. SCRS 150 routes data associated with the dialing event to the appropriate service provider. A description of the architecture and operability of components within communication system 100 follows.

Communication device 120, telephone 130 and PC 140 can communicate with each other through a variety of paths in communication system 100, and can also communicate with data SCRS 150. Communication system 100 includes a mobile switch center (MSC) 122 coupled to signaling network 142 and base station 124 for connecting calls from communication device 120 to a publicly switched telephone network (PSTN) 144.

Although not shown, signaling in and between MSC 122, signaling network 142, PSTN 144 and SCP 146 may include network switching elements, such as Service Switching Points (SSP), Tandem Switches, and Signal Transfer Points (STP). Signaling network 142 provides signaling and control for a switched portion of communication system 100 that transports voice and SMS data, for example. Point-to-point or connection-oriented signaling, such as, for example, SS7 signaling, is typically used between MSC 122, signaling network 142, PSTN 144, telephone 130 and a communication path 141 with PC 140 having a modem (not shown), as well in a communication path 145 with SCP 146. The SS7 signaling protocol is described in ITU-T Q series Recommendations, Bellcore standard "GR-606-CORE LSSGR Common Channel Signaling, Section 6.5," Issue 1, Rev. 2, Bellcore, December 1995 and ANSI standards "ANSI T1.110-1992 Signaling System No. 7 (SS7) General Information," American National Standards Institute (ANSI), 1992; "ANSI T1, 111-1992 Signaling System No. 7 (SS7) Message Transfer Part," ANSI, 1992; "ANSI T1, 112-1992 Signaling System No. 7 (SS7) Signaling Connection Control Part," ANSI, 1992, which are all hereby incorporated herein by reference.

Any other type of point-to-point or connection-oriented signaling method or protocol may be used between the above components, including error correction protocols, encapsulation protocols and/or packet switched protocols. For example, the X.25 signaling protocol may be used, as described in International Telecommunications Union (ITU) standard "ITU-T Recommendation X.25 Interface Between Data Terminal Equipment (DTE) and Data Circuit-Terminating Equipment (DCE) for Terminals Operating in the Packet Mode and Connected to Public Data Networks by Dedicated Circuit," ITU, March 1993, which is hereby incorporated herein by reference.

Base station 124 handles communication to and from communication device 120 through the use of various antennas, transceivers and other equipment for wireless communication. The procedures used to provide common cellular services with interaction between different cellular systems, including message types and the parameters therein, are described in Telecommunications Industry Association (TIA) standard "TIA/EIA IS-41.1-C Cellular Radiotelecommunications Intersystem Operations: Functional Overview," TIA, February 1996 and the other standards in the series: IS-41.2-C Intersystem Handoff Information Flows; IS-41.3-C Automatic Roaming Information Flows; IS-41.4-C Operations, Administration, and Maintenance Information Flows and Procedures; IS-41.5-C Signaling Protocols; and IS-41.6-C Signaling Procedures, each published by TIA, February 1996, hereinafter referred to collectively as TIA/EIA IS-41-C, which are hereby incorporated herein by reference.

Communication device 120 can communicate using voice communication, text message, such as SMS text messages, multimedia message service (MMS), instant messaging (IM), email or other types of data session communication. Voice communications are handled with MSC 122, while text messages are handled through an SMS center (SMSC) or a multimedia message service center (MMSC) 126. Data transmissions are conveyed through mobile data network (MDN) 128. PC 140 and a landline telephone 130 can also communicate through PSTN 144 using voice or messaging communication to connect with SCRS 150 through SCP 146. PC 140 can also communicate with SCRS 150 through IP network 160 and data gateway 162. Accordingly, PC 140 can communicate using voice communication, text or multimedia messaging, instant messaging, email and other types of data session communication through IP network 160.

SMS or MMS messages provided from device 120 through base station 124 are forwarded to message center 126 and through signaling network 142 to SCRS 150 for further processing. Data sessions established with device 120 are similarly processed through base station 124 and mobile data network 128. Data session communications are forwarded through IP network 160 and data gateway 162 to SCRS 150 for further processing in accordance with the present disclosure. Accordingly, wireless communication device 120 can communicate with SCRS 150 through a variety of paths, and can receive communications from a variety of sources in communication system 100 through a variety of paths, including signaling network 142 and IP network 160.

In similar fashion, PC 140 can communicate with a modem (not shown) through PSTN 144 and signaling network 142 with SCRS 150. PC 140 can communicate through a telephone interface, for example, that accepts dialed digits similarly to a land line telephone. PC 140 can also receive messages from various sources in communication system 100 through signaling network 142 or IP network 160, such as through email, IM or other transport channels.

Telephone 130 also sends and receives information through PSTN 144, connected to signaling network 142. Accordingly, user of telephone 130 can communicate with center 150 for further service processing in accordance with the present disclosure. In this instance, PSTN 144 has telecommunication switches that are configured to handle call processing and trigger communication with center 150. The telecommunication switches suspend call processing upon being triggered and obtain a point code destination address associated with the trigger. The information associated with the call and trigger is forwarded to the point code destination address, which address identifies SCP 146. The information forwarded from PSTN 144 to SCP 146 through signaling network 142 may include a service prefix code that caused a trigger in the telecommunication switches, a service code in accordance with the present disclosure, or other device, user or call specific information.

Although not shown in communication system 100, a number of communication devices can be coupled to IP network 160 to contact SCRS 150. For example, IP enabled television sets, telephones or other communication devices can send and receive information over IP network 160. SCP 146 also connects with SCRS 150 using an IP connection, although it should be understood that other types of connections between SCP 146 and SCRS 150 may be used. In addition, although not shown in communication system 100, another SCP can connect to SCRS 150 with an IP connection, including a connection through IP network 160 and data gateway 162.

While the following discussion is directed to the disclosed system and method involving service invocation from communication device 120, it should be understood that service invocation may be achieved through a number of communication devices that may be wireless or wired through a network, sending and receiving transmissions over connection oriented networks, such as an SS7 signaling network, or over connectionless networks including IP networks. Such networks include connections that may comprise, and share in part or in whole, a combination of wire telephone land lines, cellular radio telecommunications, coaxial cable, optical fiber, microwave or satellite communication links, for example.

In accordance with an exemplary embodiment of the disclosed system and method, communication device 120 provides a digit string for service invocation through base station 124 to MSC 122. The digit string includes a service prefix code and a service code that identifies a service provider and a requested service. MSC 122 is provisioned with a trigger that can fire upon recognition of a particular service prefix code. Service prefix code may include the digit symbols *, #, **, ##, *# or #*, for example. Upon recognition of the service code, MSC 122 suspends call processing and forwards call information to a point code destination address in accordance with the trigger configured in MSC 122. The point code destination address identifies SCP 146, so that the information forwarded from MSC 122 passes through signaling network 142 to arrive at SCP 146. SCP 146 forwards the information related to the call to a short code resolution server (SCRS) 150. The forwarding activity of SCP 146 may utilize any type of messaging to communicate with SCRS 150, including proprietary messaging limited to transmissions between SCP 146 and SCRS 150. SCRS 150 can then provide service mediation to distinguish services that are all invoked at a common DP trigger. The information forwarded to SCRS 150 may include a recognized service prefix code, service code, or other device, user or call specific information.

SCRS 150 includes the appropriate mechanisms for receiving and interpreting dialed digits, including short codes consisting of a service prefix code and a service code. Center 150 distributes service invocations to an appropriate service provider based on the dialed digits or other information related to the device, user ID or call specifics, for example. Center 150 can also store user accounts and subscriber lists, compare service codes against stored service codes corresponding to services configured for invocation, as well as provide service fulfillment. A database 156, for example, provides service configurations that can be associated with a service prefix code and/or a service code that identifies SCRS 150 as a service provider of the requested service. Receipt of a service prefix code at SCRS 150 prompts a determination of a service provider identification. If SCRS 150 is identified by the service prefix code as being responsible for service fulfillment, then center 150 performs the service indicated by the service code. If service providers 151-154 are determined as being responsible for service fulfillment based on the service prefix code, then providers 151-154 perform the service indicated by the service code. For example, SCRS 150 may provide service fulfillment in association with a service prefix code of "", while service providers 151-154** may be associated with or identified by other service prefix codes, such as "#", "#*", "*#", or other service prefix codes that may identify a service provider or service fulfillment configuration.

Some service providers or carriers may wish to offer services that are invoked with a service prefix code that is the same for different service providers or carriers. For example, a number of service providers or carriers may wish to offer services in connection with the "#" service prefix code. Alternately, or in addition, service providers or carriers may wish to use the same service code or service prefix code and service code combination to offer different services. These instances where different services are provided for the same service prefix code or code combination resolve conflicts that may arise due to different service providers serving different service prefix code domains and/or different service codes within the same service prefix code domain. In accordance with the disclosed system and method, center 150 resolves conflicts between dialable short codes, which can consist of a service prefix code and a service code, based on additional criteria associated with the call. For example, center 150 can receive information about the user of communication device 120, characteristics of communication device 120, an associated carrier, or other information that can help distinguish services invoked with a common service prefix code or service code.

For example, if SCRS 150 is identified by the service prefix code forwarded from communication device 120, a lookup in database 156 is performed to determine a service fulfillment configuration associated with the service code and communication device 120. Database 156 can be modified to add or remove service configurations in accordance with the disclosed system and method. Database 156 may also include a short code registry that contains a number of short codes in the form of "CX", where "C" represents a service prefix code comprising one or more characters such as *, #, **, ##, *#, #*, for example, and "X" represents a service code comprising one or more characters that can be represented as numeric characters. For example, the short code registry may include codes such as #BET™ (#238), COKE™ (2653) or other likewise memorable or popular code names. SCRS 150 obtains available service fulfillment scenarios from database 156, and decides how service may be fulfilled based on the service invoked by the associated service code.

For example, a service code may be provided from device 120 that is routed through base station 124, MSC 122 and signaling network 142 to SCRS 150. Center 150 then compares the sent service prefix code and service code against service prefix codes and service codes stored in database 156. Based on the result of the comparison, center 150 identifies one or more service providers or services that are requested. Center 150 may then obtain additional information related to the call, such as calling party number, subscription information, location information and device information. Center 150 uses the additional information to identify any service provider or service to be provided to the user. Once a service provider or service is identified, the appropriate service provider is notified with the appropriate information to obtain the desired service fulfillment.

In accordance with an exemplary embodiment, center 150 provides service fulfillment with messaging through signaling network 142, MSC 122 and base station 124 to provide the user of device 120 with information in the form of a displayed text response or a short message service delivery point to point (SMDPP) SMS message, for example, using the signaling channel available through signaling network 142. In addition, or alternately, center 150 can provide a trigger for a telephone call to be made to device 120 through PSTN 144. The user of device 120 may also receive information through a data channel, such as through SMS over IP through IP network 160. Other types of service fulfillment can be achieved without interacting with device 120, such as through postal mailing, emailing, facsimile transmission or scheduled interactions, such as appointments for other services.

MSC 122 is an automatic switching system in a cellular radio telecommunications network that acts as the interface for subscriber traffic between the serving cellular network and other public switched networks or other MSCs in the same or other cellular networks. MSC 122 operates similarly to a wireline or fixed network switch in a land-line-based system. The main difference between MSC 122 and a wireline switch is that MSC 122 also provides for incoming/outgoing calls and data connections through a radio frequency interface link from base station 124 to MSC 122. While wireline and wireless switches utilize different intelligent networking (IN) standards, such as advanced intelligent network (AIN), intelligent network application protocol (INAP), wireless intelligent network (WIN), customized applications for mobile enhanced logic (CAMEL) and session initiation protocol (SIP), they all function substantially the same within a query/response mechanism.

MSC 122 of the present invention is provisioned with a trigger for processing a string of symbols sent from the user, such as a digit string having a designated character prefix, such as "#", for example the digit string "#123". The trigger may be subscriber-based, group-based or office based. In accordance with one exemplary embodiment, MSC 122 is modified to be provisioned with a single office-based trigger of the form "CX" where "C" represents one or more service prefix code characters and "X" represents one or more numerical digits, which may be represented as alpha numeric characters and extended symbols in a user interface.

The trigger is armed at a detection point that specifies where in the call processing the triggering event is to be detected. The trigger also includes criteria that define what conditions are to be satisfied for the trigger to fire. Logic that defines what action the trigger will take when the trigger fires is also included in the trigger. The defined action for the trigger can include call processing suspension and the initiation of a query to another network element defined in the trigger logic.

In an exemplary embodiment, a trigger is provisioned with a detection point at a "collect digits" point in a call. The trigger criteria state that the received digit string includes a service prefix code such as "**", "#", "*#" or other specially designated characters to cause the trigger to fire. When the trigger criteria are satisfied, and the trigger fires, the trigger logic suspends call processing and generates a service query message that can include the digit string sent by the user. MSC 122 sends the service query message to SCP 146, which causes the query to be forwarded to center 150. SCP 146 provides a response to MSC 122 to indicate how the call should be handled, which handling can be based on the desired service to be provided to the user. Designation and operation of a trigger in an Intelligent Network environment is described in ITU standard "ITU-T Recommendation Q.1214 General Recommendations on Telephone Switching and Signaling-Intelligent Network," ITU, October 1995 which is hereby incorporated herein by reference.

Recognition of each desired service prefix code can be implemented as a single office-based trigger provisioned once in MSC 122. Any combination of service prefix code and service code dialing events can be handled with a single provisioning step of arming a trigger detection point with the trigger criteria for each desired service prefix code, such as *, #, **, ##, *#, or #*. The trigger provisioned at the detection point is thus armed one time to handle all service prefix codes. For the provisioned trigger, a translation table is established with the point code destination address of SCP 146 to which a service query message will be sent by MSC 122 when a trigger event occurs upon the criteria being satisfied. Although the specific implementation and modifications imposed on MSC 122 depend on the make and model of the switch, these modifications can be carried out by design engineers familiar with the architecture of the specific switch without undue experimentation.

Upon being triggered, MSC 122 initiates a query to SCP 146 using any desired type of appropriate messaging, such as Origination Request (ORREQ) messages, Wireless Intelligent Network (WIN) messages, Advanced Intelligent Network (AIN) messages, Intelligent Network Application Protocol (INAP) messages, Customized Applications for Mobile Enhanced Logic (CAMEL) messages and the Session Initiated Protocol (SIP). According to an exemplary embodiment, MSC 122 uses the IS-41 Origination Request (ORREQ) record type, as described in TIA/EIA-IS-41-C, for the service query message from MSC 122 to SCP 146, and also as the query response message from SCP 146 back to MSC 122. By convention, messages originating from MSC 122 are designated in capital letters, e.g., "ORREQ", and messages sent to MSC 122 are designated by lower case letters, e.g., "orreq". Any IS-41 record type, as described in TIA/EIA-IS-41-C, or a user defined record layout, that contains the parameters used by SCP 146 to provide service invocation and the parameters used by MSC 122 to continue call processing can be used. An IS-41 record type layout is used because it is standardized and easily accessible. The ORREQ record type is used because the parameters for service invocation are contained in this record type.

A Home Location Register (HLR) (not shown) registers a location to which the user identity of communication device 120 is assigned for record purposes related to subscriber information. For example, an HLR may contain profile information, current location, and authorization period. When MSC 122 detects communication device 120 entering the service area, for example by turning on a cellular phone or by transporting a cellular phone into the service area, MSC 122 performs a registration process that includes requesting subscriber profile information from the HLR of communication device 120. As part of the registration process, triggers that are provisioned within MSC 122 can be armed based on the subscriber profile information. Accordingly, when communication device 120 is registered with MSC 122, a subscriber-based trigger can be enabled in MSC 122. An HLR may be located within an MSC, and may be distributed over more than one physical entity. An HLR may also serve more than one MSC. Subscriber-based trigger information, as discussed above, is part of the profile information stored in an HLR on a per subscriber basis. The HLR may also include a trigger profile associated with a subscriber or a group that causes one or more triggers provisioned in MSC 122 to be armed for a specific subscriber or group of subscribers. Such a trigger profile permits selective arming of triggers provisioned in MSC 122.

SCP 146 is an intelligent network element that contains logic and data used to handle signaling or messaging queries, provide call routing instructions and perform call routing. SCP 146 receives service queries from other network elements, and responds to the query in a manner appropriate to the query in the context of the service invocation or fulfillment. SCP 146 can receive service queries from any other network element, including other SCPs. Operation of intelligent network standards are defined in various standards documents such as the advanced intelligent network (AIN) standard for wire line networks, which is described in Bellcore standard "TR-NWT-001284 Advanced Intelligent Network (AIN) 0.1 Switching System Generic Requirements, Bellcore, March 1993"; SCP operation is described in Bellcore standard "GR-1280-CORE Advanced Intelligent Network (AIN) Service Control Point (SCP) Generic Requirements," Bellcore, August 1993, which are all hereby incorporated herein by reference.

SCP 146 contains logic for signal and message processing for communication between addressable network elements in communication system 100. For example, SCP 146 can process incoming ORREQ query messages from MSC 122 and generate and transmit IS-41 orreq response messages back to MSC 122 with appropriate call routing or call status information. SCP 146 can also be configured to route information related to service invocation calls to SCRS 150. SCP 146 may also receive and handle acknowledgements from SCRS 150.

Figure 2:
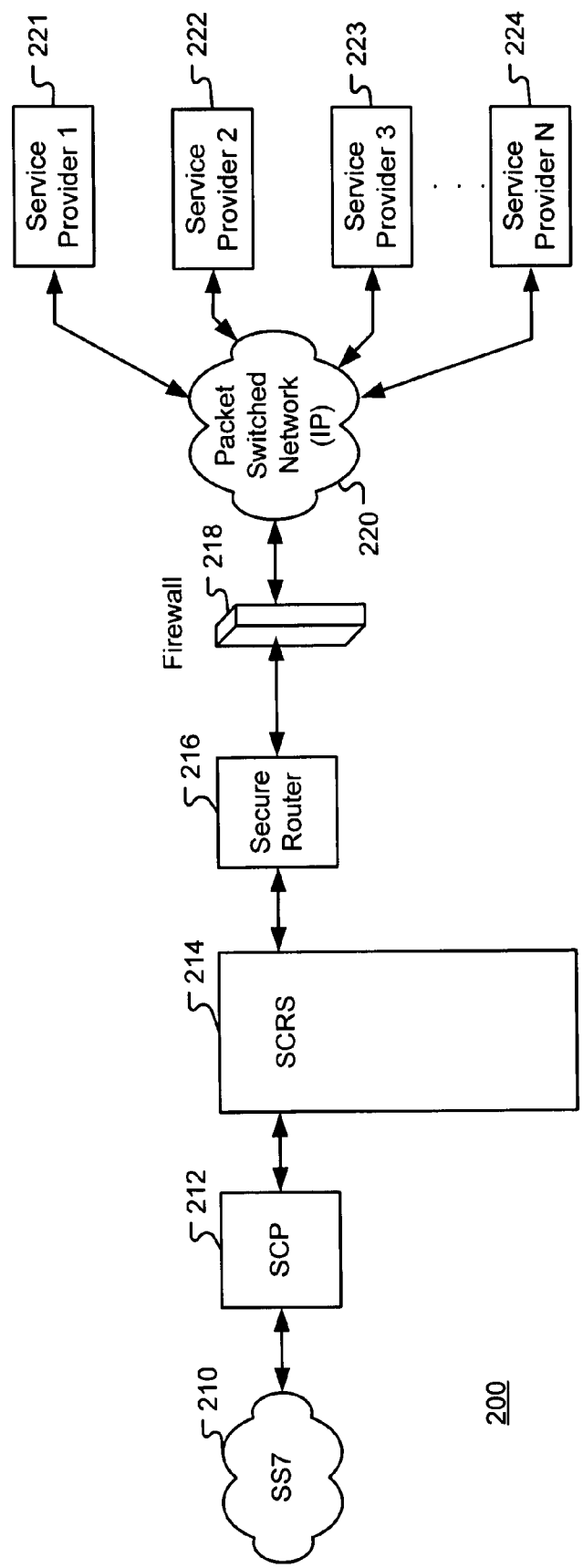
FIG. 2 is a block diagram of a portion of a communication network illustrating an exemplary embodiment of the disclosed system.

Referring now to FIG. 2, a communication system configuration 200 illustrates service invocation distributed among a number of service providers. In the exemplary embodiment illustrated in configuration 200, a user service invocation is provided through an SS7 signaling network 210. In such an environment, the user sends a digit string from a telephone interface, such as a mobile phone, which digit string is transferred through telecommunication switches and switching transfer points (STPs) to SCP 212. The telecommunication switches and STPs in network 210 are configured and provisioned to forward service invocation requests indicated by a service prefix code in the digit string to SCP 212. SCP 212 provides messaging to SCRS 214 that includes the digit string, and may provide additional information related to the user, the call, a user subscription, the telephone interface, such as the type of communication device, and any other information that can contribute to identifying a requested service and how the service is to be fulfilled for the given user. SCRS 214 performs a lookup on the digit string to determine how service fulfillment should be initiated or carried out. SCRS 214 may be configured to provide the service fulfillment indicated by the digit string. For example, SCRS 214 can provide service fulfillment in the form of a return message provided to the user. Alternately, or in addition, SCRS 214 may determine that service fulfillment should be carried out by one or more of service providers 221-224. In accordance with an exemplary embodiment of the disclosed system and method, SCRS 214 can discriminate among different services to be provided based on a single service prefix code or service code. In such a configuration, SCRS 214 may use further criteria in addition to the service prefix code and/or service code related to the call, such as the user, a subscription, registration information, location, device characteristics, including device ID, or other available information that can contribute to mediating or discriminating between service providers or services when presented with a service invocation conflict to determine a service or service provider. SCRS 214 then prompts service fulfillment by providing instructions or information to the determined service provider or providers associated with the service prefix codes and service codes in the digit string and the additional criteria. The instructions or information are provided through secure router 216 and firewall 218 to IP network 220.

The communication links between SCP 212, SCRS 214, secure router 216, firewall 218, IP network 220 and service providers 221-224 are implemented as IP connections that can carry packets through a variety of paths as defined by the internet protocol. Secure router 216 can encrypt and decrypt messages and information provided from SCRS 214 or firewall 218. For example, secure router 216 may implement a public/private key pair encryption that permits communications involving secure router 216 to have a high level of security. Firewall 218 prevents attempts to infiltrate SCRS 214 or secure router 216 stemming from IP network 220. For example, attempts may be made by persons with nefarious intentions to establish a connection through IP network 220 to secure router 216 or SCRS 214. Firewall 218 prevents such outside connections unless specifically authorized.

IP network 220 is a packet switched network that routes data in the form of data packets through connections and switches based on address information contained in the packets. IP communication is generally ubiquitous, so that connections through IP network 220 can be provided on a worldwide basis with general accessibility. Accordingly, service providers 221-124 need not be in any particular location, or under any general restrictions other than being recognized by firewall 218 to permit communication with SCRS 214. Service providers 221-224 can provide a variety of services individually or as part of groups, and typically have a range of service prefix codes and/or service codes associated with services that may be provided. Service providers 221-224 may instruct SCRS 214 on how to fulfill a service request, for example by routing the call that provided the digit string to a directory telephone number, such as an interactive voice response (IVR) system that can provide voice messages to the user. Service providers 221-224 may also provide service fulfillment independent of SCRS 214, such as by providing an email, postal mail, facsimile transmission, or other service fulfillment activities. Service providers 221-224 can also be configured to communicate with SCRS 214 to acknowledge service invocation and/or fulfillment. The acknowledgement to SCRS 214 can be used to redirect, terminate or otherwise handle the call from the user.

One advantage achieved with an exemplary embodiment of configuration 200 is the isolation of a user from service providers 221-224 for purposes of privacy, for example. SCRS 214 can act as a proxy or intermediate server that is configured to have personal or private information related to a user, as well as access and instructions for providing services from service providers 221-224. For example, SCRS 214 can utilize private information such as user location information and/or device type to provide Location Based Services (LBS) or device specific services without sharing the private data with service providers 221-224. With this configuration, service providers 221-224 provide instructions or information to SCRS 214 on how services should be provided without reference to specific individuals or personal information. SCRS 214 can then provide service fulfillment to a specific individual based on personal data or private information that is not available to service providers 221-224. In accordance with one embodiment of the disclosed system and method, SCRS 214 can be configured to act as a proxy on behalf of service providers 221-224, as discussed above, or can be configured to provide privacy information to certain trusted service providers 221-224, based on settings determined by end user preferences, carrier preferences and/or systematic business rules.

Figure 3A:
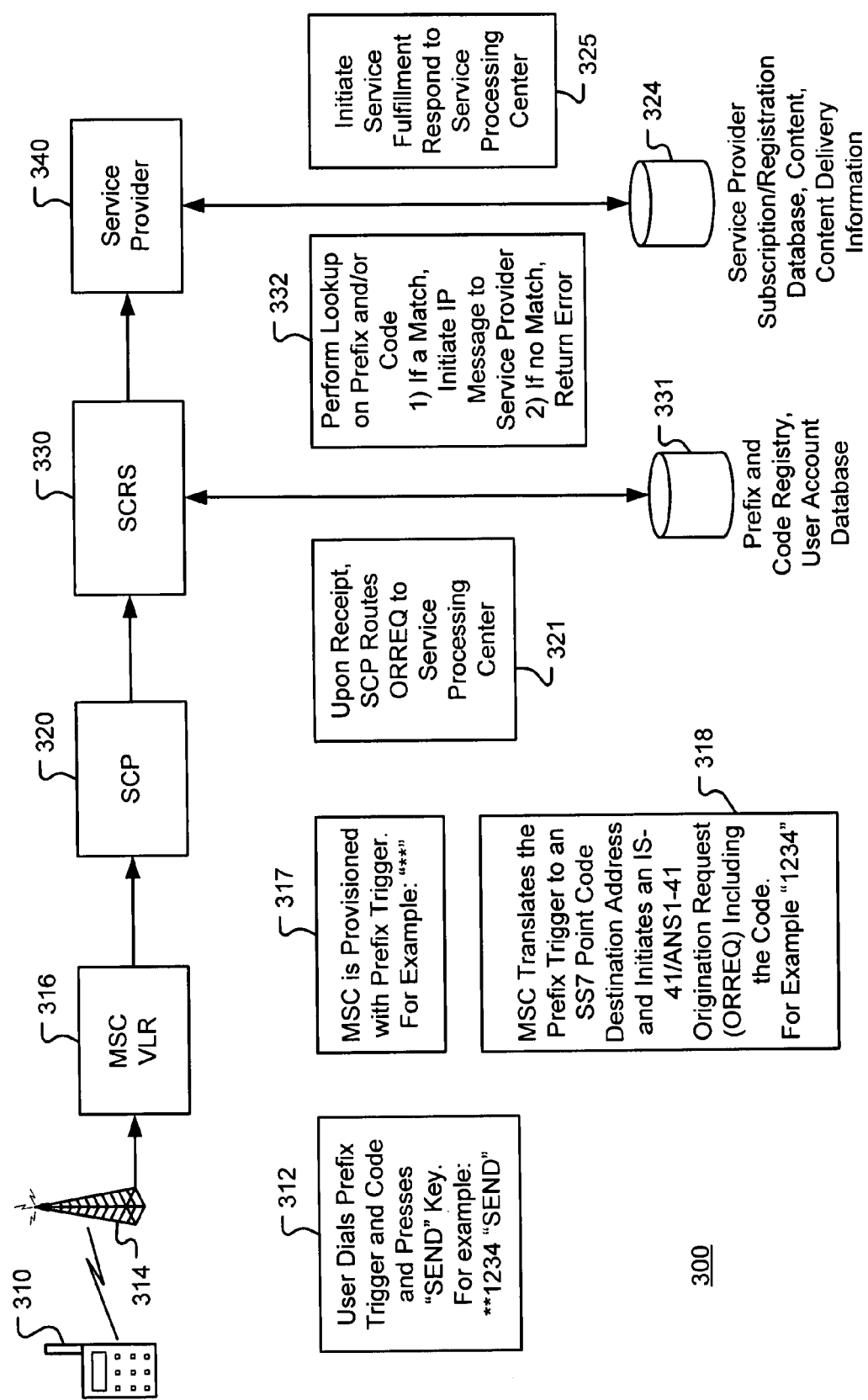
FIG. 3a is a flow diagram illustrating system operation in accordance with an exemplary embodiment of the disclosed system and method.

FIG. 3*a* shows another exemplary embodiment of the disclosed system, in which a mobile telephone user requests product information via a mobile phone. As shown in FIG. 3*a*, a user of a mobile phone 310 dials 312 a string of digits that is a non-telephone number, followed by the "SEND" key, or presses some other key, or performs some other action, as may be required to submit the dialed digits. The disclosed system may be embodied, for example, such that a predetermined button is dedicated within the phone or mobile phone interface for automatically sending a digit string for accessing the disclosed system or similar systems to obtain product information. The string of digits dialed by the user may include a first portion composed of a service prefix code or address part, as well as a second portion referred to as a service code. In addition, other radio telecommunication devices may be used to provide a string of dialed digits, including personal digital assistants (PDAs), pagers, wireless enabled laptops, and any other type of radio telecommunication device suitable for sending a digit string.

The digit string sent by the mobile phone user may be obtained by the user through a variety of techniques, such as placement within some form of advertisement for a related product and/or service. The advertisement may appear in any manner of media such as print (Magazine/Newspaper), TV/radio, direct mail or outdoor/indoor billboard advertising, and/or Internet based or other type of electronic advertising. For example, kiosks, elevators, gas stations etc. that offer advertising that may not allow direct interactivity, but which can provide the digit string to be dialed. The product information obtained using the disclosed system thus may be information related to a product or service described in such advertisements.

Mobile phone 310 sends the digit string to a cellular tower 314, which forwards the call including the digit string to a mobile switching center (MSC) 316. MSC 316 may include one or more processors and associated software and/or firmware, as well as program storage devices for storing such software and/or firmware, various input/output interfaces, and customized, application specific hardware circuitry.

MSC 316 is provisioned with a trigger that determines special processing that is to be performed in response to the service prefix code within the dialed digit string. In this regard, MSC 316 is provisioned with an office-based trigger that permits detection of a triggering event such as dialing a string that contains a particular service prefix code, for example the """ in the sent digit string 1234. When a call is received by MSC 316 that includes the predetermined service prefix code, in this case "", within the digit string of the call, MSC 316 suspends call processing and performs a translation step in which MSC 316 determines a point code destination address for further processing of the call. In this exemplary embodiment, the translation step identifies SCP 320** as an SS7 network point.

Using the point code destination address MSC 316 initiates a request message 318 that is sent to SCP 320 for further processing of the call. For example, request message 318 may consist of an IS-41/ANSI-41 Origination Request (ORREQ) message. While in the case of a CDMA type intelligent network, an ORREQ message may be used, alternatively, an equivalent message may be used within a GSM-MAP (Global Systems For Mobile Communication-Mobile Application Part) system using the CAMEL (Customized Applications for Mobile Enhanced Logic) application protocol. As shown in FIG. 3a, request message 318 may, for example, be an ORREQ message that includes a number of parameters, such as a MIN (Mobile Identification Number) that identifies the mobile phone from which the call placed, as well as a digit string parameter that stores the digits sent by the user.

Request message 318 transmitted by MSC 316 is received by SCP 320 and forwarded 321 to SCRS 330. SCP 320 and SCRS 330 may include one or more server computer systems, each of which may include one or more processors and associated software and/or firmware, as well as program storage devices for storing such software and/or firmware, various input/output interfaces, and customized, application specific hardware circuitry. SCP 320 is configured to forward messages of the type of request message 318 to SCRS 330.

In accordance with one embodiment of the present disclosure, SCRS 330 processes the received request message 318 by first determining whether the MIN in the request message is associated with a previously established user account stored in a database 331. If so, then the MIN is considered a known MIN, and SCRS 330 causes a "Thank You" message to be delivered for play back to the user indicating that the requested service invocation will be processed. Such a "Thank You" message may, for example, be provided completely through the signaling mechanisms of the underlying SS7 network through SCP 320, and does not require establishment of a voice connection. Alternately, or in addition, SCRS 330 sends an orreq response message to MSC 316 with instructions for call routing. The orreq response received by MSC 316 causes the call to be routed as a voice connection to an IVR (Interactive Voice Response) system to provide a "Thank You" voice message to the user indicating that the service invocation is being processed or has been satisfied. Moreover, some other kind of signal may be used in this regard, such as a beep or tone provided to the user indicating completion of the request.

In the case where the MIN in request message 318 is not associated with a user account in database 331, SCRS 330 can instruct SCP 320 to route the call to a call center via a voice connection, through which a call center operator can obtain information from the caller with which a user account can be established for the caller. Such information may include, for example, a delivery technique to be associated with the caller, such as an electronic mail (e-mail) address. While the establishment of user accounts and additional response mechanisms such as email may be provided in accordance with the disclosed system and method, the same are not required for operation of the disclosed system and method. In addition, other types of responses can be configured, including routing the call to a call center upon detection of the end user having a different device than that which was previously used. Such a configuration would, for example, permit a system update for the end user and/or the device, so that future responses could be optimized to the device type with respect to information and content rendering customization.

In accordance with another embodiment of the present disclosure, SCRS 330 processes the received request message 318 by performing a lookup 332 on the service prefix code included in the digit string provided by request message 318. For example, SCRS 330 issues a query to database 331 to find a match for the service prefix code and/or service code supplied in the digit string. If a match is found, lookup 332 returns an identification of a service provider 340 from database 331. If no match for the service prefix code or service code is found in database 331 through lookup 332, an error message is generated by SCRS 330 for response to the user of mobile phone 310.

In the case where a match for the service prefix code or service code is found in database 331, SCRS 330 initiates a message to the identified service provider 340 to request service processing and fulfillment. Service provider 340 may also have a database 324 that contains information related to the provision of services in accordance with the service code. In this exemplary embodiment, SCRS 330 uses the matched service prefix code to identify service provider 340 and includes the service code in the message to service provider 340 to initiate service processing and fulfillment. Database 324 may include information related to the user, such as subscription or registration content as well as other content to be provided as indicated by the service code, potentially in combination with the subscription/registration information. Database 324 may also include content delivery information, which specifies how content is to be delivered.

Database 324 may also be used to associate service codes with specific product information, such as advertiser provided content. In the event that there is product information associated with the service code in the digit string, a service fulfillment system 325 provides the product information to the user using a delivery technique indicated by the information in the user account associated with the MIN in the request message 318. For example, the information stored in a user account in database 331 may indicate that the delivery technique to be used to deliver the product information associated with the service code in the digit string is electronic mail, and further include an electronic mail address to be used as a destination address to deliver the product information to the user. Other delivery techniques may include facsimile delivery, in which case the user account may include a facsimile machine number that is to be called for the delivery of the product information. Additionally, the delivery technique may be SMS (Short Message Service), in which case the product information stored in database 324 consists of a text message to be delivered back to mobile phone 310 on which the original call was placed using the SMS protocol. Other examples of delivery techniques that may be used include a WAP (Wireless Application Protocol) push, or an MMS (Multi-media Messaging Service) message, or an EMS (Enhanced Messaging Service) message, or some other appropriate delivery technique.

Figure 3B:
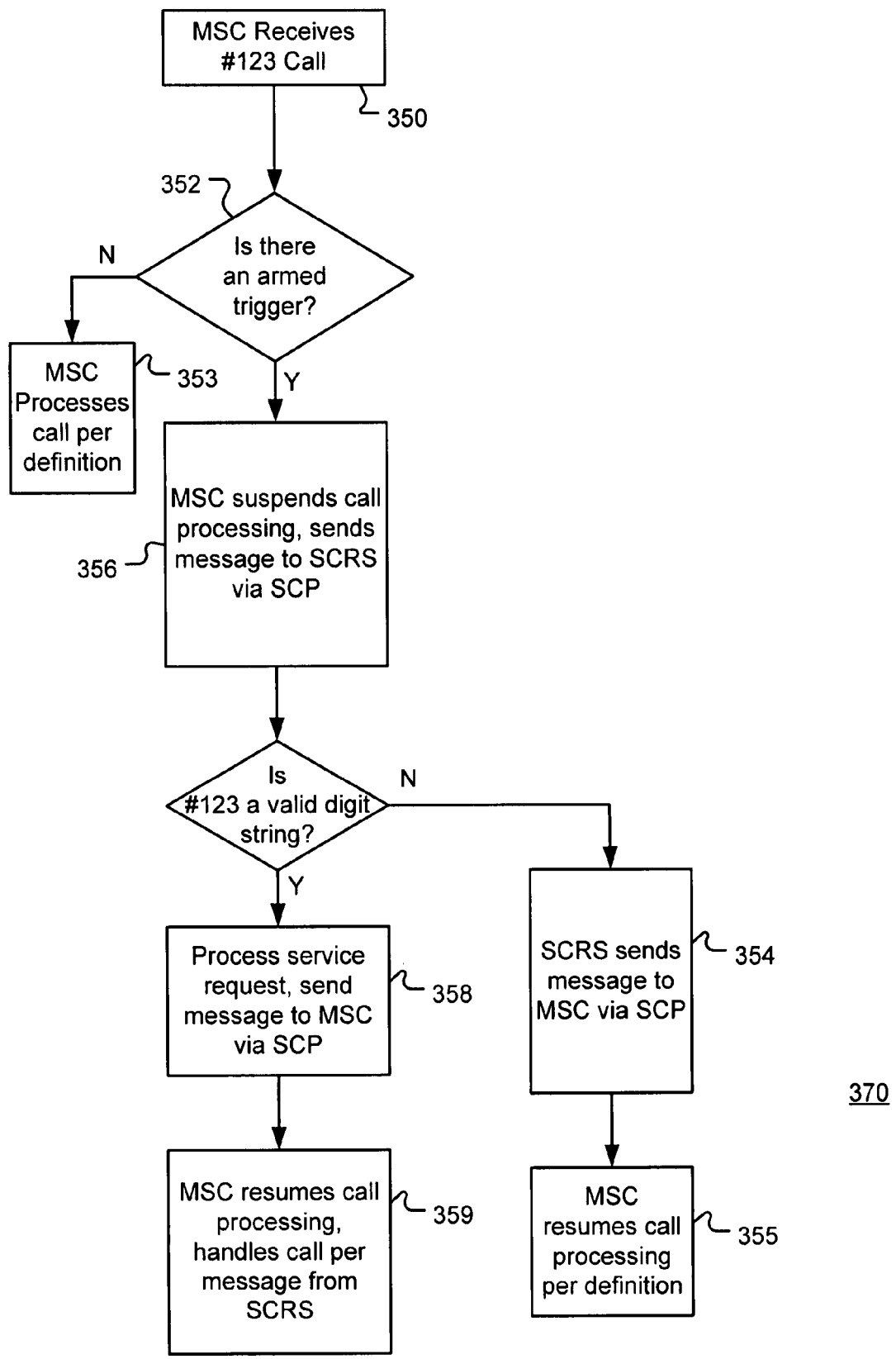
FIG. 3b is a flow chart illustrating system operation in accordance with an exemplary embodiment of the disclosed system and method.

Referring to FIGS. 1 and 3b, a flow chart 370 for typical system operation for service invocation in accordance with the present disclosure is illustrated. At step 350, MSC 122 receives a call having a symbol stream that includes a service prefix code and a service code.

At step 352, MSC 122 performs a look-up in the translation table associated with the subscriber-based, group-based or office-based triggers provisioned in MSC 122 to determine if the dialed digits correspond to a provisioned trigger. Subscriber-based intelligent network triggering may be armed at the HLR, permitting establishment of trigger criteria at the serving VLR and MSC. The triggering typically occurs at DP-2 in the BCSM. In accordance with an embodiment of the disclosed system and method, an office-based trigger may be provisioned in MSC 122 that is armed at a later stage of the BCSM referred to as DP-3. Triggering at DP-3 permits flexibility in applications that receive messaging from triggers fired at a DP-2. For example, an application may receive messaging from a trigger fired at DP-2, and choose to ignore the message, by responding to MSC 122 with a "continue" message. The "continue" message permits the BCSM to proceed to DP-3, in which a trigger associated with the disclosed system and method is fired to send further messaging to SCRS 150 through SCP 146. If there is no trigger or matching your criteria provisioned for the sequence of dialed digits, then the dialed sequence is invalid and at step 353 the call is processed per the definition for invalid sequences installed in MSC 122. The definition for handling an invalid call could include, for example, sending a message indicating that an invalid number was dialed, which would be followed by call disconnect.

If at step 352, a look-up in the translation table determines that there is a trigger provisioned in MSC 122 for the dialed digits, then at step 356 MSC 122 suspends call processing and sends a service query message to SCP 146. SCP 146 forwards the message to SCRS 150 for further processing and response. The network address of SCP 146 to which the query message is sent is contained in the translation table entry for the trigger. SCP 146 has a similar entry to permit SCP 146 to address and forward the message to SCRS 150. The messaging between MSC 122 and SCP 146 can be any of those discussed above, such as AIN, WIN, INAP, CAMEL, ORREQ or SIP. The messaging conducted between SCP 146 and SCRS 150 can also be any of those discussed above, or can be a proprietary messaging protocol used exclusively between SCP 146 and SCRS 150.

At step 357, SCRS 150 determines if the digit string is valid in the context of the services or service providers that are available through center 150. If the sequence dialed by the user is not valid, then at step 354 SCRS 150 sends a response message to SCP 146, which sends the response message back to MSC 122, indicating that MSC 122 should continue digit translation. Then at step 355, MSC 122 resumes call processing and processes the call per the definition for handling calls with invalid digit sequences.

If at step 357, SCRS 150 determines that the digit string sent by the subscriber is valid, the indicated service request is processed. At step 358 SCRS 150 sends a response message to SCP 146, which sends the response message to MSC 122. Then at step 359, MSC 122 resumes call processing and handles the call per instructions received from SCRS 150 through SCP 146 in the orreq response message.

MSC 122 is provisioned for subscriber and office-based triggers in which the trigger criteria is defined for a service prefix code including the "#" or "*" characters, or any other designated digit string that can be defined in MSC 122 for a trigger. For example, if not reserved for other call processing or signaling, a service prefix code of "100" or other numerical sequences may be used.

Figure 4:
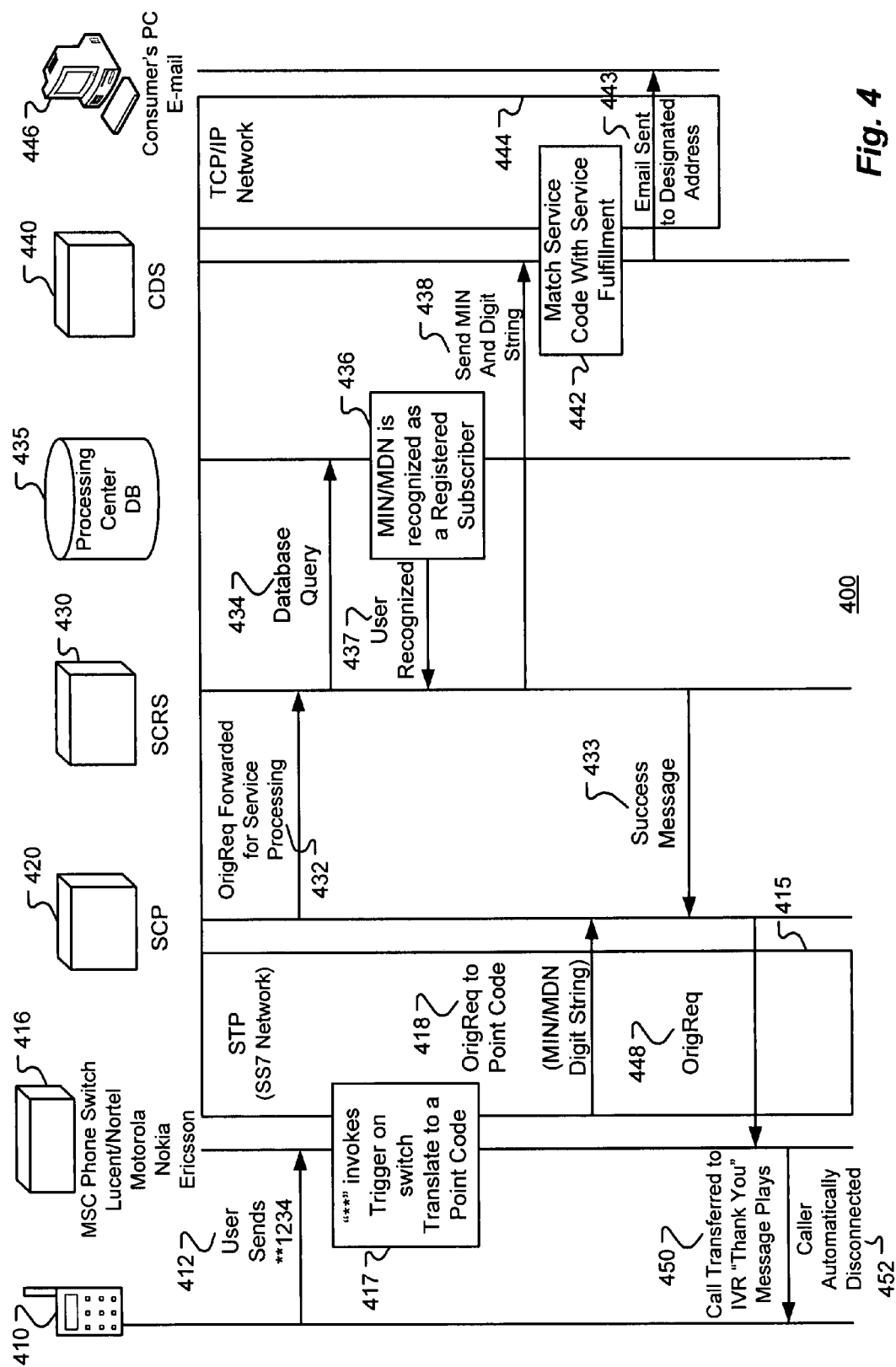
FIG. 4 is a call flow diagram illustrating operation of an exemplary embodiment of the disclosed system.

FIG. 4 illustrates an example of operation of an embodiment 400 of the disclosed system and method. As shown in FIG. 4, a user provides a digit string 412, such as by dialing digits, that includes a service prefix code such as "**", for example. The user also provides a service code following the service prefix code. The service code identifies the service requested, while the service prefix code identifies the service provider. It should be apparent that the service prefix code may serve as the service code, so that a service code is not critical to all implementations of the presently disclosed system and method. In accordance with an exemplary embodiment of the present invention, in which the user is a subscriber or is registered with SCRS 150, a service prefix code alone can be sufficient to identify a requested service, based on subscriber information or identification of communication device 120 or a determination of a location of communication device 120, for example. In accordance with another exemplary embodiment of the disclosed system and method, a service code preceded by a service prefix code can identify a service to be provided for the requester, without the use of additional information. For example, a service can be identified and provided without identification of a user, a carrier a subscription, a location or identifier for communication device 120. The following discussion is directed to the exemplary embodiment of the user providing a service prefix code followed by a service code to invoke a service.

The length of the service code may vary across different embodiments, for example between 1 and 12 digits. An MSC switching center 416 receives the call, and determines based on the service prefix code in digit string 412 that the criteria for a trigger 417 is satisfied. MSC 416 then translates the service prefix code into a point code address indicating an SS7 network destination such as a service control point (SCP) 420. As a result, a request message, such as an ORREQ message 418, including the mobile identification number (MIN) of mobile phone 410 used to place the call, as well as the digit string 412 is sent through a signal transfer point (STP) and SS7 network 415 to SCP 420. SCP 420 is configured to identify ORREQ message 418 as a service invocation that should be routed 432 to SCRS 430.

SCRS 430 receives routed ORREQ 432 from SCP 420, and issues a database query 434 to a processing center database 435 to determine a service provider associated with the service prefix code and/or service code included in the digit string. Query 434 may include parameters related to mobile phone 410, such as the MIN, calling party, or other information that may be used to help distinguish the service prefix code or service code among different service providers or services. Database 435 returns an identification of a service provider associated with the service prefix code to SCRS 430. SCRS 430 may issue another database query 434 to database 435, which includes known subscriber information, to validate the MIN in ORREQ message 418 against the set of MINs in database 435 that are associated with existing user accounts. Database 435 then determines whether the MIN in ORREQ message 418 is associated with an existing subscriber account. For purposes of explanation, as shown in FIG. 4, database 435 determines 436 that the MIN in ORREQ message 18 is recognized as being associated with a registered user, and database 435 responds with a message 437 to SCRS 430. SCRS 430 then sends 438 the MIN and the digit string from ORREQ message 18 to a content delivery system (CDS) 440 identified by the service prefix code "**", as indicated in database 435. As will be apparent to those skilled in the art, SCP 420, SCRS 430, database 435, and CDS system 440 may each include one or more processors and associated software and/or firmware, as well as program storage devices for storing such software and/or firmware, various input/output interfaces, and customized, application specific hardware circuitry.

In response to the MIN and digit string sent 438, CDS system 440 operates to match 442 the service code within the digit string with a service fulfillment configuration for the user. CDS system 440, in this exemplary embodiment, fulfils the service invocation by sending an email message 443 over a TCP/IP Network 444, such as the internet, to the e-mail address associated with the user's account. Email message 443 delivers product information, for example, including any appropriate or suitable content, including HTML (HyperText Mark-up Language) or other content types, to the user's designated email address.

Further in response to the determination 436 and message 437, SCRS 430 sends a success message 433 to SCP 420. SCP 420 then sends a message 448 to MSC 416 indicating that the request for product information has been successful. Message 448 may, for example consist of an Origination Request (orreq) message requesting MSC 416 to transfer the call to an IVR (Interactive Voice Response) system, which plays a "Thank You" message 450, or that provides some other kind of indication that the service invocation has been processed. The call is then automatically disconnected 452, after using only a few seconds of the network's airtime to complete the requested transaction.

Figure 5:
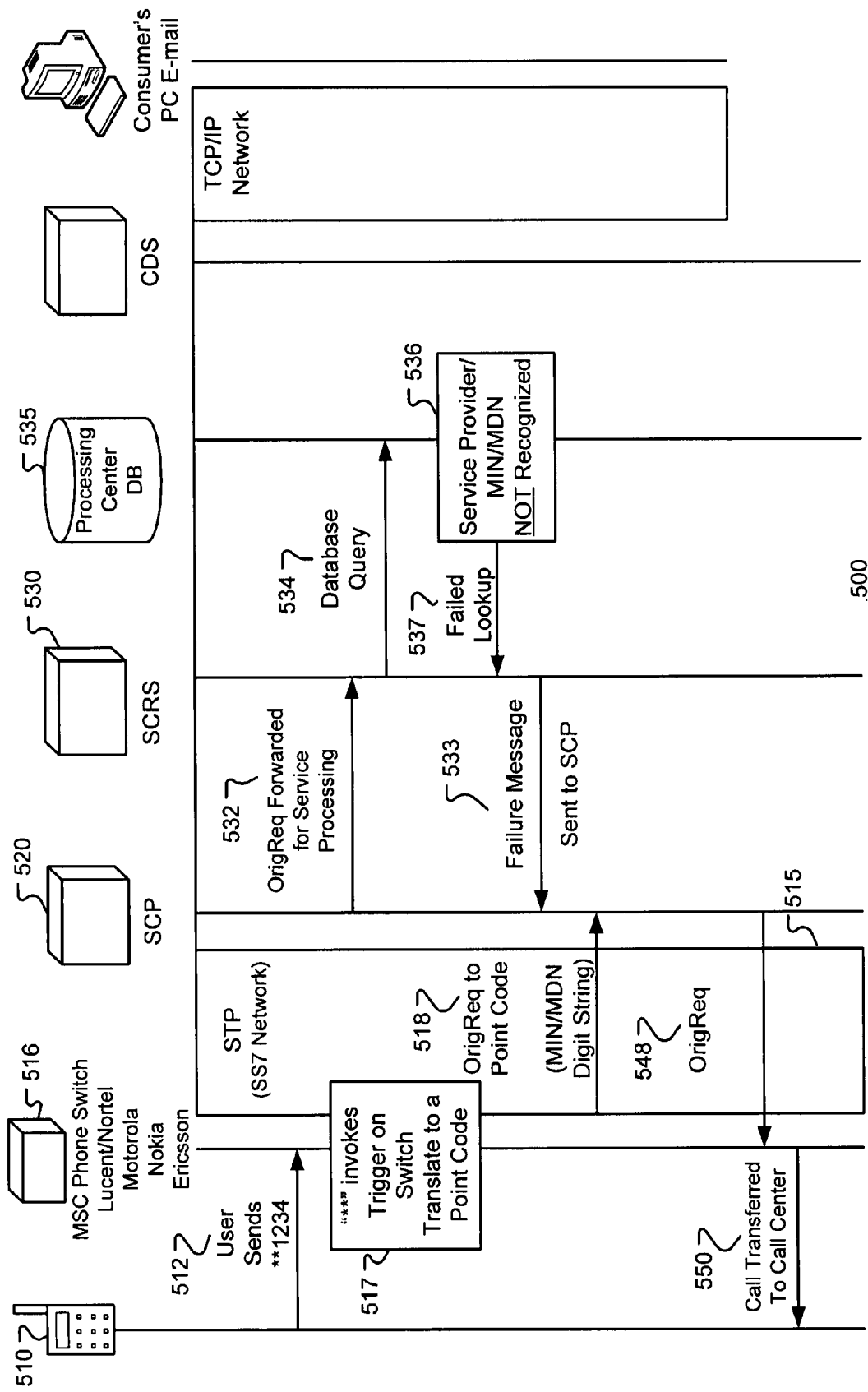

FIG. 5 illustrates another example of operation of an embodiment 500 of the disclosed system and method. As shown in FIG. 5, a user provides a digit string 512, such as by dialing digits, that includes a service prefix code such as "**", for example. The user also provides a service code following the service prefix code. The service code identifies the service requested, while the service prefix code or combination of service prefix code and service code identifies the service provider. It should be apparent that the service prefix code may serve as the service code, so that a service code is not critical to all implementations of the presently disclosed system and method. In accordance with an exemplary embodiment of the present invention, in which the user is a subscriber or is registered with SCRS 150 (FIG. 1), a service prefix code alone can be sufficient to identify a requested service. The service identification can be based on subscriber information, identification or location information for mobile phone 510, for example.

In accordance with another exemplary embodiment of the disclosed system and method, a service code preceded by a service prefix code can identify a service to be provided for the requester, without using information related to device, user, carrier or subscription identification, or a location determination for mobile phone 510. The following discussion is directed to the exemplary embodiment of the user providing a service prefix code followed by a service code to invoke a service.

The length of the service code may vary across different embodiments, for example between 1 and 12 digits. An MSC switching center 516 receives the call, and determines based on the service prefix code in digit string 512 that the criteria for a service prefix code trigger 517 is satisfied. MSC 516 then translates the service prefix code into a point code address indicating an SS7 network destination such as a service control point (SCP) 520. As a result, a request message, such as an ORREQ message 518, including the mobile identification number (MIN) of mobile phone 510 used to place the call, as well as the digit string 512 is sent through a signal transfer point (STP) and SS7 network 515 to SCP 520. SCP 520 is configured to identify ORREQ message 518 as a service invocation that should be routed 532 to SCRS 530.

SCRS 530 receives specially formatted messages 532 from SCP 520, and issues a database query 534 to a processing center database 535. Query 534 may include the service prefix code and service code included in the digit string to request a service provider associated with the service prefix code. Query 534 may also include a subscriber query to database 535, which includes known subscriber information, to validate the MIN in ORREQ message 518 against the set of MINs in database 535 that are associated with existing user accounts. Database 535 then determines whether the service prefix code or service prefix code and service code combination is associated with a service provider, and whether the MIN in ORREQ message 518 is associated with an existing subscriber account. For purposes of explanation, as shown in FIG. 5, database 535 determines 536 that the service prefix code is not recognized as identifying a service provider, or that the MIN in ORREQ message 18 is not recognized as being associated with a registered user. Database 535 responds with a message 537 to SCRS 530 to the effect that the service provider or MIN is not recognized.

In response to the determination 536 and message 537, SCRS 530 sends a failure message 533 to SCP 520. SCP 520 then sends a message 548 to MSC 516 with information for further call processing. Message 548 may, for example consist of an Origination Request (orreq) message instructing MSC 516 to transfer 550 the call to a call center where information can be obtained from the user to establish an account or subscription. Alternatively, an SMS text message may be generated and sent requesting that the user to reply with their e-mail address, in lieu of connection to the call center in the case where a determination is made that the user has SMS capability. Alternatively, a text message and/or audio response may be provided to the end-user informing them that the code dialed is invalid and/or providing other customer service information.

Figure 6:
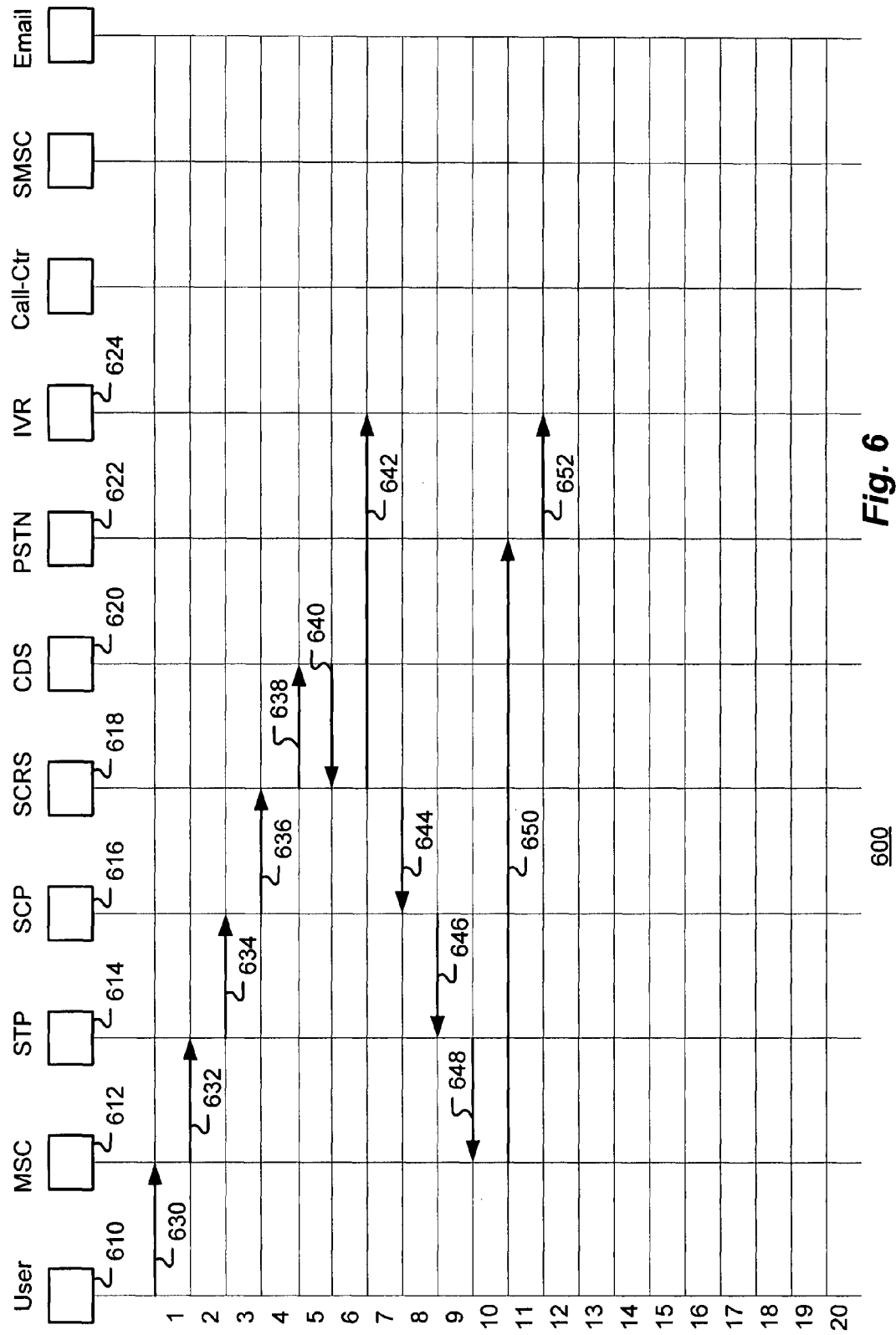
FIG. 6 is a call routing diagram illustrating an exemplary embodiment of the disclosed system and method.

Referring now to FIG. 6, a diagram of call processing operations 600 in accordance with an exemplary embodiment of the present disclosure is illustrated. Call processing is initiated with a user 610 sending a service prefix code and service code from a mobile phone, for example. In this example, user 610 enters the digits #ABC (#222) into the mobile phone and presses SEND. The call is sent via route 630 to MSC 612 for call processing in accordance with the call processing definitions imposed on MSC 612. Route 630 represents an SS7 signaling connection. In this instance, MSC 612 recognizes the "#" service prefix code in the form of a trigger and suspends call processing. An office-based trigger for the "#" service prefix code was previously provisioned in MSC 612 to permit triggering when various service prefix codes are encountered. MSC 612 may be provisioned with a trigger armed for a limited number of service prefix codes such as *, #, **, ##, *# and/or #* associated with a single trigger detection point that provides call logic for call handling.

Upon being triggered, MSC 612 sends an ORREQ message over SS7 signaling route 632 to STP 614. STP 614 performs default routing of all special code messages, including the ORREQ message to SCP 616 via SS7 signaling route 634. While routes 630, 632 and 634 are represent as being implemented as SS7 signaling paths, any other type of appropriate signaling protocol may be used.

SCP 616 forwards the specially formatted message via route 636 to short code resolution server (SCRS) 618. Route 636 represents an IP connection, but can be any type of signaling connection, and does not rely on standard SS7 signaling. SCRS 618 performs a lookup on the basis of the service prefix code "#" and service code "222" to identify a namespace or specific owner of the special code #ABC (#222) within that namespace. In the embodiment of FIG. 6, SCRS 618 successfully matches the service prefix code "#" with a content delivery system (CDS) 620 and routes a message to CDS 620 over route 638. Route 638 is a secure pathway, such as may be obtained with public/private key pair encryption over an IP connection. In addition, route 638 may pass through a firewall for added security protection. The message provided by SCRS 618 may include the special code #ABC and other information available from user 610 or SCRS 618, such as an MIN/MDN, device, subscription or location information, for example.

CDS 620 processes the message from SCRS 618, and sends a response through route 640 to SCRS 618 to indicate how the call should be handled to provide the requested service. As with route 638, route 640 can be implemented as a secure IP connection. In accordance with the embodiment illustrated in FIG. 6, CDS 620 indicates to SCRS 618 that the call should be routed to a designated IVR. SCRS 618 then sends a message to IVR 624 over route 642 to provide information about the call to IVR 624. The information may include a calling party number and a called party number, for example.

SCRS 618 then returns an orreq message to SCP 616 over route 644, acknowledging processing of the call by CDS 620 and providing specific call management procedures. SCP 616 routes the orreq message to STP 614 over route 646, which is implemented as an SS7 signaling pathway. STP 614 forwards the orreq message to MSC 612 over SS7 signaling pathway 648.

Using response information provided from SCRS 618 in the form of the orreq message, MSC 618 routes the call placed by user 610 over route 650 through PSTN 622 to the directory phone number of IVR 624 through route 652. Route 652 is a circuit-switched connection with routing call set up.

FIGS. 1-6 show various communication system components that are described in different contexts, but can be implemented to have the same functionality. For example, SCRS 150 can be implemented as SCRS 214, 350, 430, 530 or as short code resolution server (SCRS) 618. Other similarly named communication network components can likewise be implemented to have the same functionality. In addition, terms such as telecommunications switch can be used to refer to a land line based network switch or a mobile switching center (MSC) used with a radio telecommunications network. Such terms are meant to be interchangeable without limitation on the breadth of their meaning.

The disclosed a system and method permits a user to provide a series of digits through a communication device, such as a mobile phone or landline phone, to invoke services from any of a number of service providers. A network addressable element in the form of a short code resolution server distributes service invocation among a number of service providers. The number of service invocation triggers provisioned in a telecommunications switch can be greatly reduced, thereby conserving switch resources. A vast array of services can be provided by numerous different service providers through the short code resolution server acting as a distribution center. The potential applications of the disclosed system are many and varied, and include allowing the user to request additional information about a particular product or service, participate in voting or polling activities, reprint an article or other publication, request and authorize a purchase of a magazine subscription, music sound clip, or other product, and/or share personal information with other users. As described in the illustrative embodiment above, once a user has entered the digits for the desired service invocation and presses the send key on their mobile phone, the requested product information is automatically sent to the user without any need for the user to hear a ring tone or for the call to "connect" or be answered in the traditional manner of a typical voice call. The act of dialing the digits and pressing send causes service invocation and fulfillment to meet the users' request.

Moreover, the illustrative embodiment of the disclosed system may operate without making a voice channel call, but instead using part of the SS7 signaling channel the phone system normally uses for call setup and call tear-down. In the disclosed system, the telecommunications switch recognizes the call as a service invocation call, as opposed to a normal voice channel call, in response to the service prefix code within the series of digits entered by the user. The telecommunications switch makes this determination in part based on the inclusion of a service prefix code such as the * key or the # key, for example.

Various additional enhancements may be provided with regard to the disclosed system. For example, an extension of the disclosed technology enables the remote control of cable television set top boxes to be used to enter digit strings including the predetermined service prefix code and service code used as described above, in order to invoke a service, such as to obtain product information that is to be delivered to the user. Using such an embodiment, a user watching television can respond to an advertisement by pushing keys on their remote control, and the set top box sends the request message upstream to the cable company, where a server operates to provide the product information to the user, for example through an e-mail message.

The disclosed system and method provide service invocation support independent of registration or subscription by a user. Registration or subscription can provide certain advantages for operation of the disclosed system and method, but are not required for the system and method to be operable. A configuration of the system and method based upon a subscription model can be implemented by provisioning the mobile network operator system databases, such as the HLR, with a trigger profile that can be used to arm a trigger provisioned in an associated MSC. Another configuration of the system and method based on a non-subscription model provides triggering criteria for the entire communication network on a global basis within the mobile network operator system by provisioning network elements such as a telecommunications switch with a service invocation trigger. The non-subscription model is based on a single provisioning step in which the switch is armed with an office-based trigger associated with various service prefix code combinations as triggering criteria. The single provisioning step means that the telecommunications switch can be configured one time with the triggering criteria that can be used to invoke numerous types of different services.

The disclosed system and method also provide the advantage of a query-response system that operates with existing or yet to be defined protocols for service invocation including IS-41 or ANSI-41. Any type of messaging format or protocol may be used for this type of system, including Origination Request (ORREQ) messages, Wireless Intelligent Network (WIN) messages, Advanced Intelligent Network (AIN) messages, Intelligent Network Application Protocol (INAP) messages, Customized Applications for Mobile Enhanced Logic (CAMEL) messages and the Session Initiated Protocol (SIP). Some prior systems relied on connection-oriented operation, such as a voice circuit switched connection to an IVR. Other prior systems are based on store-and-forward operation, such as SMS. Still other prior systems are session-based, such as a WAP implementation. Each of these prior systems use fixed messaging or protocols that offer little flexibility or adaptability for new communication paradigms or standards.

The disclosed system can also support voting or polling, for example by enabling the user to dial first predetermined digit string, such as #NBC™-1 (#6221), for Yes, and a second predetermined digit string, such as #NBC™-2 (#6222), for No in response to a poll or to enter a vote. Similarly, another predetermined string, such as #CBS™-3 (#6223) could be used to indicate selection of answer #3 in a multiple choice answer question in response to TV or Radio poll questions. The disclosed system permits interaction with TV or radio poll questions without the user to dialing an 800 number, or without moving to a PC with Internet access. Additionally, the disclosed system can operate without an SMS text message or WAP interface on the user's phone to permit the user to participate in a vote, for example.

Other applications of the disclosed system will also be apparent to those skilled in the art. For example, the service prefix code portion of the dialed digits may indicate a variety of services other than requesting product information delivery. For example, the below service prefix codes, which correspond to keypad characters also indicative of the type of information requested, could be used to request other kinds of information when entered into a mobile phone:

| #200 | (#C00) | Request a user's contact information |
|---|---|---|
| #400 | (#I00) | Request Additional Product Information |
| #600 | (#M00) | Request Restaurant Menus |
| #700 | (#R00) | Request Article Reprints |
| #730 | (#RE0) | Request Info on Real Estate |
| #800 | (#V00) | Participate in a Poll or Vote |
| #900 | | Request Product Information inside Store |
| #768 | (#PMT) | POS (Point of Sale) Payment in Stores |

The above #XXX format service prefix codes are given for purposes of explanation only, and the disclosed system is not limited to such an embodiment. For example, the different services that may be provided through the disclosed system do not have to be distinguished by different service codes, but may alternatively be distinguished by the value of the service prefix code. Moreover, the specific services given above for purposes of explanation are not to be considered an exhaustive list of the services that may be provided using the disclosed system. Other services, such as subscription services regarding magazines, or credit card requests, and/or special document requests for documents such as tax forms or other legal forms, requests for stock quotes, annual or quarterly reports, or other financial information, are also examples of services that may also or alternatively be provided using the disclosed system.

The disclosed system and method permits service fulfillment to take the form of providing information associated with another user in accordance with a value of the service code. Such a configuration permits person-to-person, or peer-to-peer interaction and communication, such as may be desirable among individuals within a given affinity group, such as a social network. Social networking applications may include interactive real-time, near real-time and non-real-time communication, as well as sharing of content, news and information, for example. Another application of permitting user information to be shared permits a called party to specify an experience that a specific calling party has when attempting to communicate or interact with the called party.

Those skilled in the art should further appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims. that modifications can be made to the present invention without departing from the scope and spirit thereof. It is intended that the scope of the invention be defined by the claims appended hereto and their equivalents.

What is claimed is:

1. A method for forwarding a service request with a call that from a communication device in a communication system for later fulfillment of the service request, comprising:

provisioning a database comprising a non-numeric prefix code and a corresponding point code address, at a telecommunication switch, to thereby provision the telecommunication switch to later recognize the non-numeric prefix code in a digit string received from the communication device;

storing the non-numeric prefix code and the corresponding point code address in a memory of the telecommunication switch;

receiving the digit string from the communication device during a call processing, at the telecommunication switch, comprising the non-numeric prefix code, and wherein the digit string further comprising a service code indicating a service to be fulfilled;

translating the non-numeric prefix code to the point code address which indicates a network address of a destination service control point (SCP) using said database;

suspending the call processing and transmitting a message to said SCP, the message comprising the digit string;

in response to said receiving the digit string, forwarding the message, by the SCP, to a service processing center, wherein the service processing center is connected to a plurality of service providers;

if the service processing center determines the digit string is invalid, transmitting, by the service processing center, via the SCP to the telecommunication switch a command configured to cause the switch to continue translate the digit and resume the call processing;

if the service processing center determines the digit string is valid, performing a service fulfillment in accordance with the service code and a user service delivery profile, and providing the telecommunication switch with instructions to resume the call.

2. The method according to claim 1, further comprising forwarding the message, from a service processing center located at the point code address, to one of a plurality of service providers to indicate a service requested of the service provider based on the non-numeric prefix code.

3. The method according to claim 1, wherein the message further comprises one or more of user, communication device, subscription or location information.

4. The method according to claim 1, wherein the message comprises one or more of an Origination Request (ORREQ) message, a Wireless Intelligent Network (WIN) message, an Advanced Intelligent Network (AIN) message, an Intelligent Network Application Protocol (INAP) message, a Customized Applications for Mobile Enhanced Logic (CAMEL) message or Session Initiated Protocol (SIP).

5. The method according to claim 1, wherein the digit string is a short code.

6. The method according to claim 1, wherein the telecommunication switch is provisioned to recognize the non-numeric prefix code at one or more detection points in a basic call state model processing sequence.

7. The method according to claim 1, wherein the non-numeric prefix code comprises one or more of the digit strings #, *, **, ##, *# or #*.

8. The method according to claim 2, further comprising implementing the service processing center as a proxy service to prevent private data associated with the message from being directed to the plurality of service providers.

9. The method according to claim 2, further comprising selectively providing, by the service processing center, private data associated with the message to one of the plurality of service providers in accordance with one or more of end-user preferences, carrier preferences or private data forwarding rules.

10. The method according to claim 1, further comprising selecting, by a service processing center located at the point code address, one of a plurality of service providers for service fulfillment based on a location of the telecommunication switch.

11. A system comprising a telecommunication switch and service processing center configured for forwarding a service request from a communication device in a communication system for later fulfillment of the service request, the telecommunication switch comprising:
a memory for storing non-numeric prefix codes and corresponding point code addresses; and a processor configured for
(i) receiving database comprising a non-numeric prefix code and a corresponding point code address to thereby provision the telecommunication switch to later recognize the non-numeric prefix code in a digit string received from the communication device,
(ii) storing the non-numeric prefix code and the corresponding point code address in the memory,
(iii) receiving the digit string from the communication device comprising the non-numeric prefix code during a call processing and wherein the digit string further comprising a service code indicating a service to be fulfilled,
(iv) translating the non-numeric prefix code to the point code address which indicates a network address of a destination service control point (SCP) using said database, and (v) suspending the call processing and transmitting a message to the SCP specified by the point code address, the message comprising the digit string; the service-fulfillment database is configured for storing records each comprising service codes and fields indicating service-fulfillment configurations associated with the service codes; and a processor configured for (i) receiving the message from the SCP, (ii) identifying the service code contained within the message, (iii) looking up, in a service-fulfillment database, a service-fulfillment configuration based on the identified service code, (iv) if the service processing center determines the digit string is invalid, transmitting by the service processing center via the service control point (SCP) to the telecommunication switch a command configured to cause the switch to continue translate the digit and resume the call processing;
if the service processing center determines the digit string is valid, performing a service fulfillment in accordance with the service code and a user service delivery profile and providing the switch with instructions to resume the call and providing a service based on service-fulfillment configuration.

12. The system according to claim 11, wherein the message further comprises one or more of user, communication device, subscription or location information.

13. The system according to claim 11, wherein the message is formatted as a call information message.

14. The system according to claim 13, wherein the call information message comprises one or more of an Origination Request (ORREQ) message, a Wireless Intelligent Network (WIN) message, an Advanced Intelligent Network Intelligent (AIN) message, an Intelligent Network Application Protocol (INAP) message, a Customized Applications for Mobile Enhanced Logic (CAMEL) message or Session Initiated Protocol (SIP).

15. The system according to claim 11, wherein the digit string is a short code.

16. The system according to claim 11, wherein the telecommunications switch is provisioned to recognize the non-numeric prefix code at one or more detection points in a basic call state model processing sequence.

17. The system according to claim 11, wherein the non-numeric prefix code is one or more of the digit strings #, *, **, ##*# or #*.

18. The method of claim 1, wherein the telecommunication switch does not look up multiple functions based on the non-numeric prefix code.

19. The method of claim 1, wherein translating the non-numeric prefix code to the point code destination address is accomplished without recognition of numeric digits following the non-numeric prefix code in the digit string.

20. The system of claim 11, wherein the telecommunication switch does not look up multiple functions based on the non-numeric prefix code.

21. The system of claim 11, wherein translating the non-numeric prefix code to the point code destination address is accomplished without recognition of numeric digits following the non-numeric prefix code in the digit string.

* * * * *